Oct. 25, 1955.  W. J. LINN  2,721,791
LIQUID FUEL ATOMIZERS WITH DIFFUSER MEANS
Filed Nov. 10, 1951
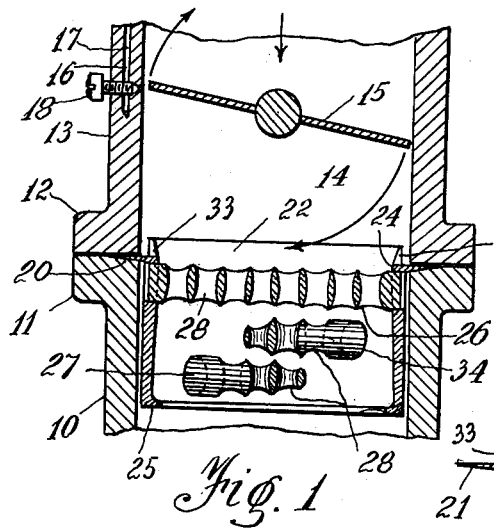
Fig. 1
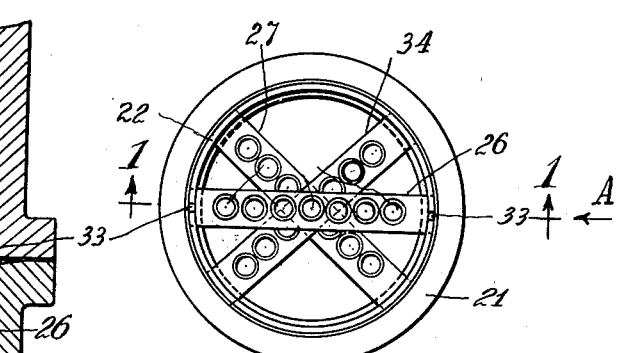
Fig. 8  Fig. 2  Fig. 7
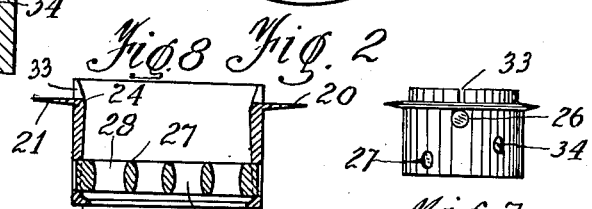
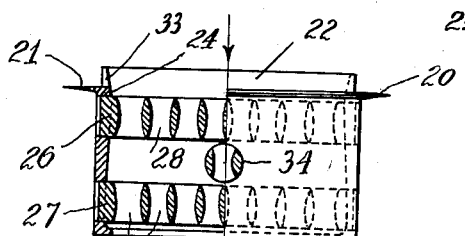
Fig. 3
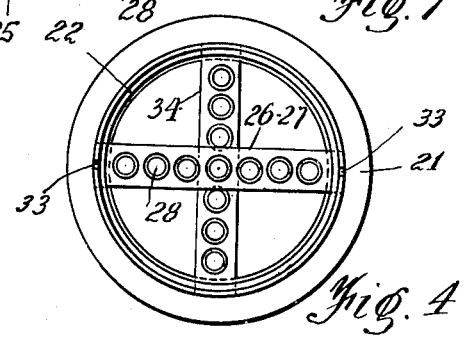
Fig. 4
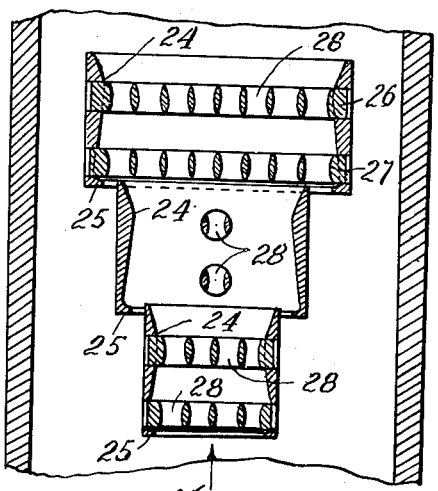
Fig. 5
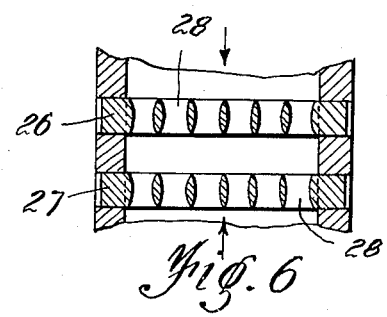
Fig. 6
William J. Linn,
Inventor
By Ralph Donath
Attorney

United States Patent Office 2,721,791
Patented Oct. 25, 1955

2,721,791

LIQUID FUEL ATOMIZERS WITH DIFFUSER MEANS

William J. Linn, Pittsburgh, Pa.

Application November 10, 1951, Serial No. 255,781

7 Claims. (Cl. 48—180)

This invention relates to liquid fuel atomizers and mixers and particularly to devices of this type as used in connection with the fuel and air charging ducts in carburetors and manifolds of internal combustion engines for improving the degree of mixing and the quality of the explosive mixture delivered to the combustion chambers.

Various devices have been suggested for this purpose, none of which, however, completely and successfully atomizes the liquid fuel so as to prevent raw and unatomized liquid fuel from entering into the combustion chamber of the engine cylinders. Unatomized liquid fuel, usually in the form of small droplets, is undesirable in the combustion chamber since it tends to pass around the piston rings during the compression stroke of the engine and to pass into the crankcase where it dilutes the oil. This produces a reduction in the lubricating qualities of the oil, thereby increasing the friction, causing excessive carbon formations and loss of thermal and mechanical efficiency.

An object of the present invention is to obviate these difficulties by more effectively atomizing the liquid fuel in the air and fuel charging duct. This is accomplished by the use of a special diffuser means disposed in the axis of the fuel and air duct.

Another object of this invention is to provide means for collecting the droplets of liquid fuel which collect on the walls of the fuel and air duct and return them to the fuel and air mixture as vapor.

A further object of this invention is to provide means for creating added turbulence in the fuel and air stream to commingle the returned liquid fuel droplets with the fuel and air stream.

More effective atomizing and diffusing of the liquid fuel and air may be accomplished by combining the special diffuser means of the invention with a flow velocity changing means, such as a venturi for alternately accelerating and decelerating the air and fuel mixture. When used in combination with a venturi, the special diffuser means is preferably placed in the throat and exit of the venturi so that the turbulence created by one is immediately augmented by the other, thereby breaking up the fuel droplets and thoroughly mixing them with the air to produce an improved combustion mixture.

The efficiency of this combination results from the considerable turbulence which is created in the fuel and air stream, first by the flow velocity changing means which may take the form of a single or a plurality of Venturi tubes, and second by the special diffuser means which includes at least one cylindrical member extending substantially across the diameter of the throat of the venturi. An air and fuel mixture passing through a charging duct in which such a combination is installed is alternately axially and radially accelerated and decelerated by the venturi action of the flow changing means. This action creates peripheral turbulence in the mixture tending to cause the particles of fuel to be broken up and intermingled with air. This action in itself has not proven sufficient in practice to atomize effectively the entire stream of air and fuel and particularly the central portion. The special diffuser means of this invention acts upon the central portion and creates a substantial turbulence therein which causes the fuel to be more nearly completely atomized and intermixed with the air than has been heretofore possible.

Preferably the special diffuser means of this invention takes the form of at least one cylindrical member extending diametrically across the path of the incoming fuel and air stream. Preferably this cylindrical member is provided with a plurality of side by side venturi passages extending from one side to the other in the direction of fuel and air flow. These passages in conjunction with the effect of the body of the cylindrical member create a greatly improved commingling of fuel and air. The effectiveness of the diffuser means can be improved by placing one or more additional diffuser means in the duct either below and parallel to the first member, below and transverse to the first member, or one or more diffuser means below and in staggered relation to the first.

Still further objects and advantages of this invention will become apparent by referring to the accompanying drawings in which:

Figure 1 is a vertical section on line 1—1 in Figure 2 through an air and fuel charging duct having the combination of flow velocity changing means and diffuser means positioned in staggered relation to the first diffuser means.

Figure 2 is a top plan view of a diffuser means and flow velocity changing means according to the invention.

Figure 3 is a side elevation, partly in section showing a second embodiment of the invention.

Figure 4 is a top plan view of the embodiment shown in Figure 3.

Figure 5 is a vertical section through a carburetor fuel and air duct showing a third embodiment of the invention.

Figure 6 is a vertical sectional view through an air and fuel mixture stream body as used for small engines, such as outboard motors for boats, showing the diffuser means in accordance with the invention.

Figure 7 is a view looking in direction of arrow A in Figure 2.

Figure 8 is a vertical section through an air and fuel charging duct having a single diffuser means extending diametrically and in close proximity of the lower main venturi ridges of the charging duct.

Referring first to Figure 1, there is illustrated a conventional manifold inlet 10 having a flange 11 connected to a flange 12 of the carburetor 13 thereby forming a passage 14 hereinafter termed "Fuel and air charging duct." The butterfly valve 15 of the carburetor is located in the carburetor body between the flange 12 and the fuel jet (not shown) immediately above it. An idling jet 16 communicates by a passage 17 with a fuel chamber (not shown) of the carburetor and furnishes fuel for idling when the butterfly valve 15 is near closing position, as shown. Adjusting screw 18 serves to regulate the free area of idling jet 16 and with it the amount of fuel supplied and the speed of the idling engine.

Such a carburetor manifold combination is generally old and will supply only partially atomized fuel to the engine. A combination of this type is subject to all the undesirable qualities which have been previously mentioned as characteristic of ordinary carburetors and which are solved by this invention.

A flow velocity changing means is inserted into the air and fuel charging duct 14 by means of a flange 20 inserted between the inner edges of the carburetor flange 12 and the manifold flange 11. The flow velocity changing means include a radial baffle surface 21 extending peripherally about the interior of the duct and formed in part by the flange 20. This baffle surface 21 along with the portion of the wall 22 extending thereabove form a well or reservoir within which the condensed liquid fuel which collects on the internal walls of the carburetor is collected. Slot 33 in the wall 22 communicate between this wall and the interior of the flow changing means. The flow changing means is in the form of a venturi having a restricting ridge 24 intermediate its ends and an exit ridge 25 immediately at the exit end of the venturi. These ridges cause a restriction in the flow of gases which causes it to move faster through the restriction than on either side and at the same time create turbulence in the mixture leaving the ridges thereby causing the fuel and air to be more thoroughly commingled. A cylindrical diffuser member 26 extends diametrically across the throat of the venturi, that is to say from the top of ridge 24 on the opposite side of the venturi. A second diffuser member 34 extends across the diameter of the venturi just below the diffuser member 26 and at an oblique angle thereto. A third cylindrical diffuser member 27 extends across the diameter of the venturi just below the second diffuser member 34 at an oblique angle to the first sub-diffuser member 34 at an oblique angle to the first substantially equal to the angle between the first diffuser 26 and second diffuser 34 but from the opposite side of diffuser member 27. A plurality of side by side openings or venturis 28 pass through each of these cylindrical members in the direction of fuel and air flow. The openings 28 extend along the entire length of the diffuser member from side to side of the venturi throat.

In Figure 3 is shown another embodiment of this invention in which the upper and lower diffuser members 26 and 27 are substantially parallel one below the other and the intermediate diffuser member 34 extends transversely to and between the above mentioned two parallel diffuser members.

In Figure 5 is shown still another embodiment of this invention in which a plurality of venturis of decreasing diameter are installed in series. Each of the first and last venturi has a pair of cylindrical diffuser members parallel to each other and parallel to the pair in the other venturi. The middle venturi has a pair of cylindrical diffuser members parallel to each other but transverse to the diffuser members of the first and last venturis.

In Figure 6 is shown an embodiment of the invention which is especially adapted for small engines in which the diffuser members extend across the air and fuel mixture stream through a tubular body.

In Figure 7 is shown the staggered relationship of the diffuser members in the venturi wall.

In operating an internal combustion engine having the device of this invention, the liquid fuel is introduced into the fuel and air charging duct from the fuel jet in the usual manner. The fuel is there picked up by the stream of air and carried along the duct. A considerable part of the fuel remains in the form of drops which impinge on the walls of the duct. This portion of the fuel is collected on the baffle plate 21 and reintroduced into the fuel and air stream through the slots 33 which open directly above the cylindrical diffuser member 26. The fuel and air mixture which passes along the duct enters the venturi where it is alternately accelerated and decelerated by passing through between the ridges 24 and 25 and the enlarged pockets which immediately follow these ridges. This alternate acceleration and deceleration causes the flow of the fuel and air mixture to become turbulent, especially along the periphery of the stream, thereby intermixing the fuel and air and breaking the fuel into smaller particles.

As the fuel and air mixture passes through the venturi it strikes the diffuser members 27 and 34. A part of the air and gas mixture passes around the rounded surface of the diffuser member and part passes through the series of openings or venturi openings therein. This division of flow of the air and gas mixture in the center of the stream thereby gets the advantage of three mixing effects (1) the effect of the main venturi ridges 24 and 25, (2) the effects of the side by side venturis in the diffuser members, and (3) the flow alteration by the body of the diffuser members themselves. These various effects cooperate to produce a commingling of fuel and air such as has been heretofore impossible and results in surprisingly improved engine performance.

The turbulent currents caused by the diffuser members, its venturis and the main venturi cooperate to set up compounded turbulence in the interior of the duct and venturi. Such increased turbulence acts to atomize the fuel and to intermix it with air to an extent heretofore impossible to attain.

Although several presently preferred embodiments of this invention have been illustrated, it is to be understood that it may be otherwise embodied within the scope of the following claims.

I claim:

1. A liquid fuel atomizer for a fuel and air charging duct of an internal combustion engine comprising a venturi flow velocity changing means alternately axially and radially accelerating and decelerating the air and fuel mixture moving in said duct whereby peripheral turbulence is created in the fuel and air mixture along the walls of said duct and at least one cylindrical diffuser member extending in the axial direction diametrically across the interior of the flow velocity changing means, said diffuser member having a plurality of spaced side by side flow velocity changing means extending therethrough transverse to its axis from one end thereof to the other and open in the direction of flow of the fuel and air mixture.

2. A liquid fuel atomizer for a fuel and air charging duct of an internal combustion engine comprising a tubular sleeve adapted to be disposed in the duct between the carburetor and the engine, said sleeve having attachment means intermediate its ends for mounting in said duct, said attachment means having a baffle surface defining with the outer surface of the sleeve a well adjacent the periphery of the duct, a venturi tube formed on the internal surface of the tubular sleeve whereby peripheral turbulence is created in an air and fuel mixture moving in the duct and at least one cylindrical diffuser means extending in the axial direction diametrically across the interior of the sleeve within the venturi duct, said diffuser member having a width less than the diameter of the duct and a plurality of spaced side by side individual venturis along its length and open in the direction of flow of the fuel and air mixture.

3. A liquid fuel atomizer as claimed in claim 2 in which the outer surface of the sleeve forming part of the well is provided with a pair of slots on opposite sides thereof opening into the interior of the sleeve above the ends of the diffuser member.

4. A liquid fuel atomizer as claimed in claim 2 having three cylindrical diffuser members extending diametrically across the interior of the sleeve at oblique angles to each other, one above the other in staggered vertical relationship.

5. A liquid fuel atomizer as claimed in claim 2 having three cylindrical diffuser members extending diametrically across the interior of the sleeve, one above the other, the upper and lower members being substantially parallel to each other on a common vertical plane and the third extending between and transversely to them.

6. A liquid fuel atomizer for a fuel and air charging duct of an internal combustion engine comprising a tubular sleeve adapted to be disposed in the duct between the carburetor and engine, said sleeve having attachment means intermediate its ends for mounting in said duct, said attachment means having a baffle surface defining with the outer surface of the sleeve a well adjacent the periphery of the duct, a plurality of venturi tubes formed on the internal surface of the tubular sleeve whereby peripheral turbulence is created in an air and fuel mixture moving in the duct and at least one cylindrical diffuser member extending in the axial direction diametrically across the interior of the sleeve adjacent the constriction of each venturi, said diffuser member having a plurality of spaced side by side individual venturis along its length and open in the direction of flow of the fuel and air mixture.

7. A liquid fuel atomizer for a fuel and air charging duct of an internal combustion engine comprising a tubular sleeve adapted to be disposed in the duct between the carburetor and the engine, said sleeve having attachment means intermediate its ends for mounting in said duct, said attachment means having a baffle surface and flange on said sleeve defining with the outer surface of the sleeve a well adjacent the periphery of the duct, a venturi tube formed on the inner surface of the sleeve a plurality of venturi tubes fixed within the sleeve receiving the fuel and air mixture therefrom whereby peripheral turbulence is created in an air and fuel mixture moving in the duct and at least one cylindrical diffuser member extending in the axial direction diametrically across the interior of the sleeve in each venturi member, said diffuser member having a plurality of spaced side by side individual openings along its length and open in the direction of flow of the fuel and air mixture.

References Cited in the file of this patent

UNITED STATES PATENTS

| | | |
|---|---|---|
| 1,503,371 | Meyer | July 29, 1924 |
| 1,785,501 | Secor | Dec. 16, 1930 |
| 1,790,854 | Defrance et al. | Feb. 3, 1931 |
| 2,048,535 | Bicknell | July 21, 1936 |
| 2,078,558 | Borell | Apr. 27, 1937 |
| 2,133,623 | Linn | Oct. 18, 1938 |

FOREIGN PATENTS

| | | |
|---|---|---|
| 567,953 | Germany | Jan. 12, 1933 |